(No Model.)
P. A. N. WINAND.
TRACTION ENGINE.
No. 525,829. Patented Sept. 11, 1894.
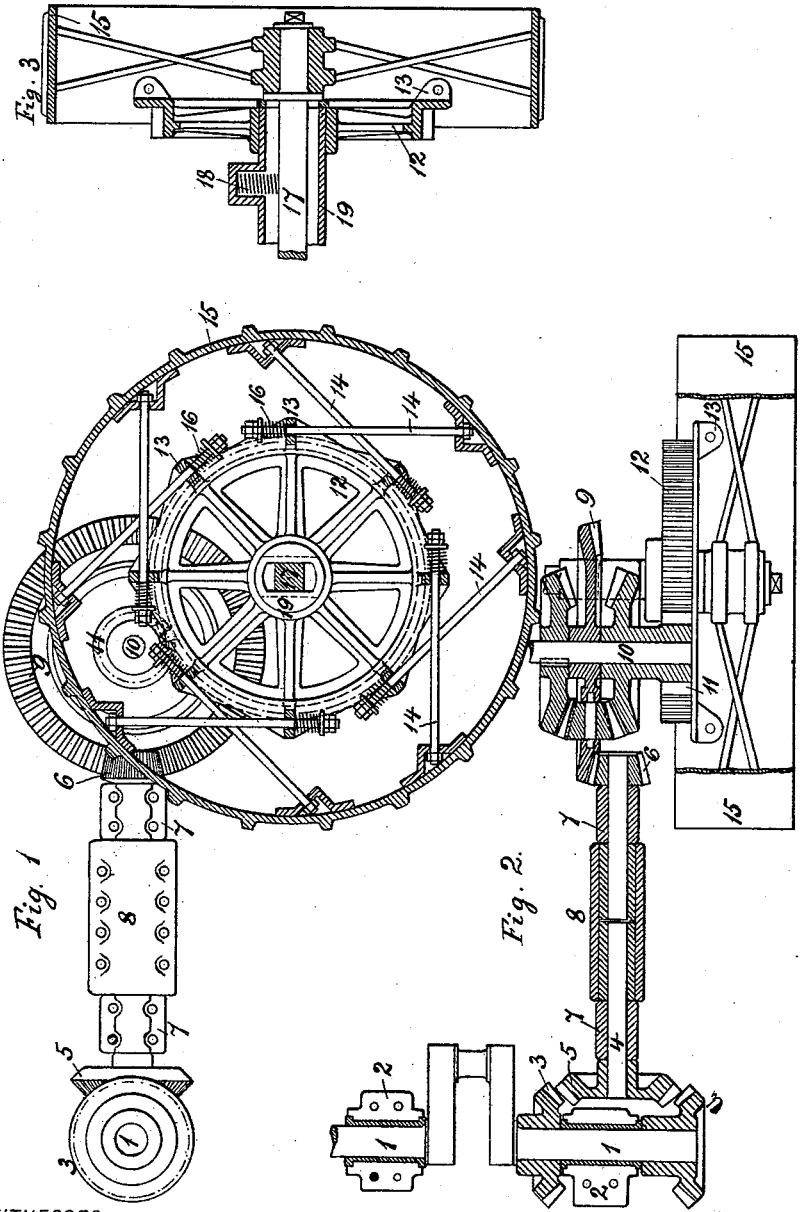
WITNESSES:
Chas. C. Collier
Adaman G. Smith
INVENTOR
Paul A. N. Winand
BY
Chas. B. Collier,
ATTORNEY.

UNITED STATES PATENT OFFICE.

PAUL A. N. WINAND, OF PHILADELPHIA, PENNSYLVANIA, ASSIGNOR TO MESS, SCHLEICHER, SCHUMM & CO., OF SAME PLACE.

TRACTION-ENGINE.

SPECIFICATION forming part of Letters Patent No. 525,829, dated September 11, 1894.

Application filed July 26, 1893. Serial No. 481,569. (No model.)

*To all whom it may concern:*

Be it known that I, PAUL A. N. WINAND, a subject of the King of Belgium, but now residing in the city and county of Philadelphia and State of Pennsylvania, have invented certain new and useful Improvements in Traction-Engines, of which the following is a specification.

My invention relates to traction or self propelling road engines and refers more particularly to such engines in which the motive power is derived from a gas or oil engine.

Referring to the drawings, Figure 1, is an elevation. Fig. 2 is a sectional plan of the driving mechanism. Fig. 3 is a vertical section through the center of driving wheel.

1 1 is the crank-shaft of the engine, supported in bearings, 2, 2. Bevel gears 3, 3, are keyed on the shaft.

4 is an intermediate shaft carrying bevel gears 5 and 6, supported in bearings 7, 7. Shaft 4 is made in two parts and these are connected by a coupling 8.

Gear 6 engages with a gear 9 mounted on a compensating gear which drives a counter-shaft 10. This counter-shaft carries at one end a pinion 11, which engages with the gear 12, and at the other end (not shown) it carries a similar pinion engaging with a similar gear. This gear 12, is connected by means of rods 14, passing through lugs 13, on the rim of gear 12, to the driving wheel 15. The connection is not a rigid one but is effected by means of springs 16. The wheel 15, is mounted loose on the end of the axle 17. This axle is allowed to move but only up and down and is sustained by springs 18. It is shown as contained in a box-shaped casting, 19, whose end serves as a pivot for the gear 12. The bearings 7, 7, of intermediate shaft 4, are connected together, and can be so moved that the end of the shaft which carries the gear 6, does not change its position and said gear 6, remains in gear with 9, while the end which carries gear 5, is shifted so as to bring 5, in gear with one or the other of gears 3. In this manner the motion of the gear can be stopped and reversed without stopping or reversing the motion of the motor. This is of great advantage when the motor is of the kind known as gas or oil engines. In order to prevent injury from excessive strains when gear 5 is thrown into gear, the shaft 4 is made in two parts, connected by a friction coupling, 8. This is shown as consisting of two half shells, connected by bolts, hubs secured on shaft 4 being clamped between these shells. The amount of clamping is so adjusted that the hubs can slip between the shells but only when the strain becomes greater than the normal working strain. This friction-coupling will act as a safeguard also in case of accidental obstruction in some other part of the mechanism. As gas or oil engines are generally provided with very heavy fly-wheels some part would give way in case of an obstruction if it were not for the slipping of the friction coupling which will slip when the strain reaches a certain limit.

The elastic connection between the wheel 15 and the gear 12 and the elastic suspension of the axle 17 relieves the mechanism from sudden strains and jars when the machine is set in motion and when the wheel strikes an obstacle.

It is not novel to suspend the axle on springs nor to interpose springs between the driving wheel and the mechanism, but the present manner is new and it allows to have all the gears on rigid centers in the most simple way.

I wish to have it understood that I do not limit myself to the construction as described. Some other known device could be used instead of the gears 3 and 5 for reversing the motion in connection with the friction coupling, and the latter can be constructed in any other way known in the mechanical arts.

Having thus described my invention, what I claim as new, and desire to secure by Letters Patent, is—

1. In a traction engine, the combination with the motor mechanism and the traction wheels, of an intermediate shaft for transmitting motion from said mechanism to the traction wheels, said shaft being made in two parts, and said parts being connected at their adjacent ends by a friction coupling 8, and the parts of said coupling being connected by bolts or similar means, all as and for the purposes set forth.

2. In a traction engine, the combination of the motor mechanism and the traction wheels 15, an intermediate shaft 4 for transmitting motion from said mechanism to said wheels, said shaft being made in two parts and said parts being connected together at their adjacent ends by a friction coupling, the axle for supporting the traction wheels, a gear journaled on said axle and receiving its motion from the shaft 4, through compensating mechanism, and spring rods connecting said gears and traction wheels and supporting the same, all as and for the purposes set forth.

In testimony whereof I have hereunto subscribed my name, in the presence of two subscribing witnesses, on this 13th day of July, A. D. 1893.

PAUL A. N. WINAND.

Witnesses:
GEO. W. REED,
CHAS. C. COLLIER.